Patented Aug. 27, 1935

2,012,394

UNITED STATES PATENT OFFICE 2,012,394

HYDROXYDIPHENYLKETOCARBOXYLIC ACID SALTS OF 3-PHENYL DIHYDRO-QUINAZOLINES

Walter Kropp, Elberfeld, Germany, assignor to Winthrop Chemical Company, Inc., New York, N. Y., a corporation of New York No Drawing. Application September 28, 1928, Serial No. 309,132. In Germany October 6, 1927

3 Claims. (Cl. 260—32)

The present invention relates to the manufacture of nearly tasteless salts from therapeutically active organic bases with hydroxy-diaryl-keto-carboxylic acids.

In accordance with the invention therapeutically active organic bases, such as hydrastinine, 3-phenyl-dihydroquinazoline quinine, strychnine, and the like are caused to be reacted upon by a hydroxy-diaryl-keto-carboxylic acid, whereby the corresponding salts are obtained. The process of their manufacture may be, for instance, by melting together the components, or by causing the components to react with one another in a suitable inert organic solvent such as alcohol, ether and the like, or by preparing the desired compounds by double decomposition of suitable salts of the base (for instance the sulfate) and the acid (for instance the barium salt).

The products thus obtainable naturally differ in their properties in wide limits according to the bases used, but are generally nearly tasteless crystals, rather easily soluble in alcohol. By virtue of these properties the salts are medically valuable products for use in the medicamentation per os, especially since the acid components of the salts are completely harmless for men.

The following examples illustrate my invention, without limiting it thereto, the parts being by weight:

*Example 1.*—208 parts of 3-phenyl-dihydroquinazoline are dissolved in 2080 parts of ether and this solution is caused to drop into a solution of 242 parts of p-hydroxy-benzoyl-o-benzoic acid while stirring. The salt being formed soon separates. It is filtered and recrystallized from boiling alcohol. Colorless crystalline masses are thus obtained, containing one molecule of crystal alcohol. Melting point 187–190° C.

The reaction probably takes place according to the following equation:

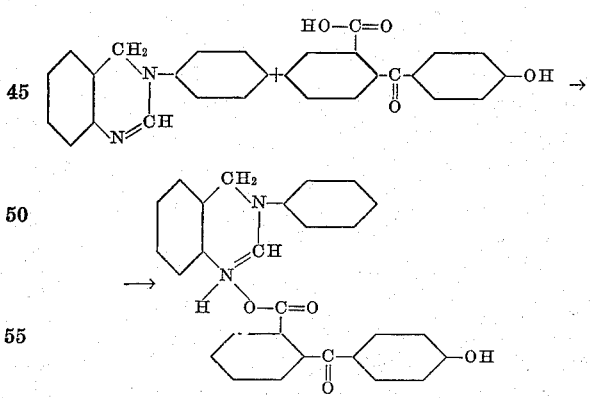

*Example 2.*—208 parts of 3-phenyl-dihydroquinazoline are dissolved in 1000 parts of alcohol and this solution is caused to drop into a solution of 258 parts of 2,4-dihydroxy-benzoyl-2'-benzoic acid in 2500 parts of alcohol. The separating crystals are filtered and recrystallized from hot alcohol. They form colorless glittering prisms containing one mol of crystal alcohol. Melting point 119° C.

The reaction probably takes place according to the following equation:

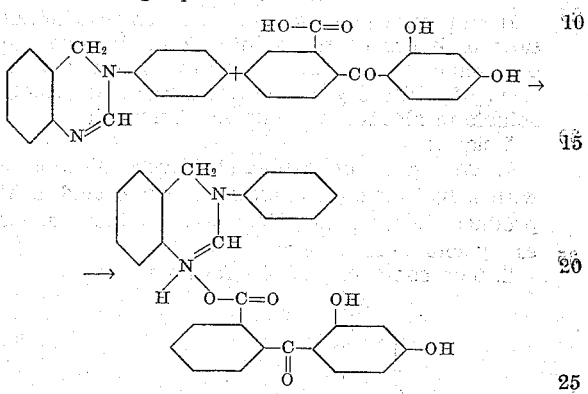

*Example 3.*—292 parts of 4-hydroxy-naphtoyl-2-benzoic acid are mixed with 208 parts of 3-phenyl-dihydroquinazoline and the mixture is heated above its melting point. After cooling, the reaction product is pulverized and recrystallized from hot alcohol. Melting point 120° C.

The reaction probably takes place according to the following equation:

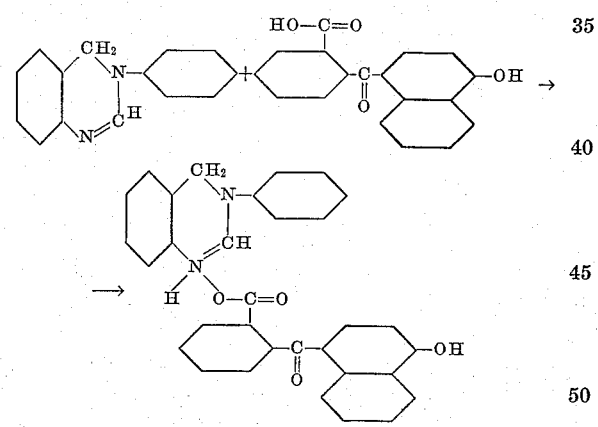

*Example 4.*—500 parts of 2,4-dihydroxy-benzoyl-2'-benzoic acid and 350 parts of N-di-diethylaminoethyl-3.4-dimethoxyaniline are separately dissolved in ether and the two solutions are poured at the same time into 2000 parts of ether. The crystals separating are filtered, washed with ether, dried, pulverized and recrystallized from hot alcohol.

The reaction probably takes place according to the following equation:

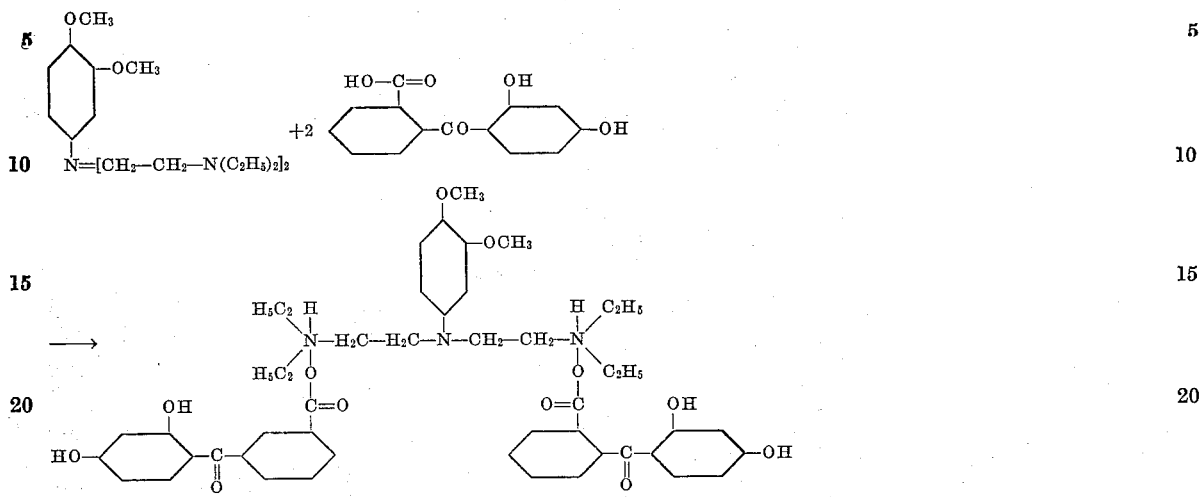

In an analogous manner the corresponding salts of hydrastinine, quinine, and the like are obtainable with the acid above mentioned in form of white crystalline powders rather easily soluble in alcohol of about 30% strength.

I claim:

1. The salts of 3-phenyl-dihydroquinazoline with a hydroxydiphenylketocarboxylic acid, said products being nearly tasteless crystals, rather easily soluble in alcohol.

2. The compound of the formula

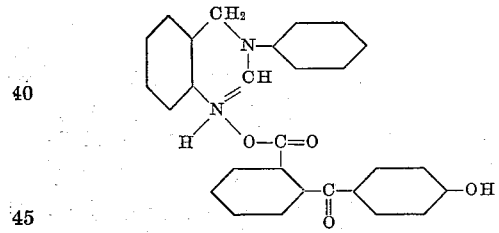

said product forming when crystallized from alcohol colorless crystals containing one molecule of crystal alcohol and showing a melting point of about 187 to 190° C.

3. The compound of the formula:

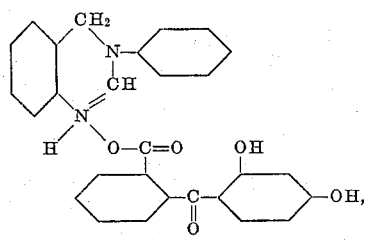

said product forming when crystallized from alcohol nearly tasteless colorless glittering prisms containing one molecule of crystal alcohol and showing a melting point of 119° C.

WALTER KROPP.